Hook & Darlington,
Coating Oil Barrels.
No. 1,860. Reissued Jan. 31, 1865.
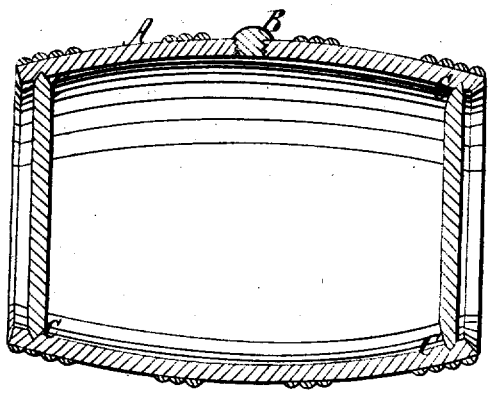
N. PETERS, PHOTO-LITHOGRAPHER, WASHINGTON, D. C.

UNITED STATES PATENT OFFICE.

THE UNITED STATES BARREL COATING COMPANY, OF NEW YORK, N. Y., ASSIGNEES, BY MESNE ASSIGNMENTS, OF ALBERT H. HOOK AND J. H. DARLINGTON, OF SAME PLACE.

IMPROVEMENT IN COATING BARRELS TO RENDER THEM OIL-TIGHT.

Specification forming part of Letters Patent No. 43,025, dated June 7, 1864; Reissue No. 1,860, dated January 31, 1865.

*To all whom it may concern:*

Be it known that ALBERT H. HOOK and J. HENRY DARLINGTON, of the city, county, and State of New York, assignors, by mesne assignments, to UNITED STATES BARREL COATING COMPANY, have invented certain new and useful improvements in coating barrels and other vessels intended to hold oils or other substances of greater or less penetrative character, of which invention the following is a full and accurate description, which will enable others skilled in the art to fully understand and use the same, reference being had to the accompanying drawing, which is hereby declared to be a part of this specification.

When petroleum—sometimes called "coal-oil"—and other liquids of like subtile penetrative character are put in wooden barrels or other vessels or reservoirs for transportation or storage, they have been found to leak very rapidly through the joints of the vessels and through any minute crevices or fissures existing in their sides, and also through the pores of the wood, which thus becomes saturated with the oil or other liquid placed therein. The evaporation, which takes place so soon as the liquids exude upon the surfaces of the vessels, together with the leakage through such joints and crevices, cause such liquids to waste away very rapidly, and bring great losses upon the owners. The attempts which have been heretofore made to remedy this state of things by making such vessels impervious to the attacks of such liquids have not been successful. Among such attempts is the plan of coating the inside of the vessels with a coating of glue; but this has not succeeded, because the film of glue cracks and soaks off, leaving the seams and pores of the wood exposed to the action of the liquids.

The object of this invention is to prepare wooden and other vessels which are meant to hold petroleum and other penetrating liquids, so that such liquids cannot pass through their seams or through the body of the wood or other substances of which they are made; and it consists in filling their pores and their seams, joints, and crevices with glue and gelatine so treated and combined with other substances that it will not become hard and brittle or be liable to peel off, as heretofore. Such preparations of glue are known and have been used for the purpose of making printers' inking-rollers, and for other purposes. The common mode of preparing such compositions is by combining softened glue with molasses, sugar, and other substances, so as to form a yielding, partially elastic, and adhesive composition. The application of such an elastic or yielding composition made of glue or gelatine to barrels and similar vessels, as hereinafter described, so as to make such vessels suitable for the storage and transportation of petroleum, coal-oil, benzine, and similar hydrocarbon liquids, constitutes this invention.

In preparing the composition, when glue and molasses are used, the glue is to be soaked, and the molasses afterward added thereto and the mixture subjected to a high heat until a complete union is formed between them. The exact proportions of the ingredients do not need to be given, further than to state that the molasses must be in quantity sufficient to prevent the glue from becoming brittle and from cracking. A good and safe proportion is about one gallon of molasses to two or three pounds of glue, according to the strength of the glue and consistence of the molasses. Other substances capable of forming, with glue, a composition of similar physical properties—that is, a composition which will not become brittle, somewhat elastic, and yielding—may be substituted for the molasses, and, instead of glue, gelatine may be used.

When the ingredients have been thoroughly mixed, the composition, while still hot, is applied to the vessel to be treated in substantially the following manner: Referring to the drawing, which represents a barrel, A, meant to contain oil for transportation, the operator removes the bung B and fills the barrel with the composition. Hydraulic pressure may then be applied to the composition contained therein by suitable appliances, so as to force the same into the pores of the wood and into the seams between the staves, and into the joints C; or the like result may be attained by producing a vacuum about the sides of the barrel A. In the latter case the barrel should be placed in a vacuum-chamber before the composition is poured into it; or a comparatively small quantity may be poured into the vessel—say from three to ten gallons of the composition for a barrel of ordinary size—and the bung B being then well secured, the barrel or vessel is to be violently agitated or tossed or rolled over and over endwise and in every possible direction, so as to cause the composition to come in contact with the joints C, the seams, and with its whole inner surface. The air within the barrel will become heated by means of the heat of the composition, and will become greatly expanded, and the expansive force thereof will operate to force the composition into the joints and seams of the barrel, and also into the pores of the material of which it is made, so that the body thereof will be thoroughly saturated therewith, and a faithful agitation of the barrel during the time of the confinement of the liquid therein will cause its inner surface to be thoroughly coated with the composition. The pressure produced by either of these means upon the joints of the vessel and its seams and its pores causes them to be widened or enlarged, and allows the composition the more easily to saturate the substance or body of the vessel and to fill its seams and joints. When the temperature of the composition and of the confined air falls, the pressure falls with it, and the parts return to their normal condition, but will be found to be thoroughly permeated or saturated and coated with the composition. The bung B being removed, that portion of the composition not taken up in saturating and coating the vessel is to be poured out, and the vessel is ready to receive the oil or other substance to be held therein as soon as the composition has become cooled and thoroughly set.

Any subtile or volatile liquid may be held and transported in vessels of wood or other porous substances which have been prepared according to this invention. When additional precautions are needed to enable the composition to resist the action of water or other solvents which may be present in the liquid to be confined in the barrel, the coating may be washed with a solution of tannin, the effect of which will be to enable the composition to resist the action of any such solvent which may be present in the oil or other liquid to be put up—as, for instance, in the case of some kinds of crude and refined petroleum which contain water and other foreign matters. The bung B and the bung-hole of the barrel should be also saturated and coated with the hot composition, and they may be fitted with screw-threads, as shown in the drawings. When extraordinary care needs to be used—as in the case of vessels which are to be transported great distances and subjected to violent agitation and to great changes of temperature—they may be subjected to a second and third saturation and coating; but in general a single application and treatment are found to answer the purpose of making a barrel or other vessel perfectly tight and impervious to the porous exudation or the leakage of oils and other substances of a volatile, subtile, or penetrative character.

Having thus described the said invention of the said ALBERT H. HOOK and J. HENRY DARLINGTON, the said UNITED STATES BARREL COATING COMPANY claim as new and original therein and desire to secure by Letters Patent—

1. Sealing barrels and other vessels by means of a compound of glue and molasses or their equivalents, substantially as and for the purpose above described.

2. Subjecting the said composition, after it has been applied to the vessel under treatment, to the action of tannin, substantially as and for the purpose above described.

THOS. S. DAKIN,
*President U. S. Barrel Coating Co.*

Witnesses:
M. M. LIVINGSTON,
C. L. TOPLIFF.